United States Patent [19]

Folds et al.

[11] 3,995,804
[45] Dec. 7, 1976

[54] INVERTED OPEN CHANNEL SOLAR HEAT COLLECTOR PANEL

[75] Inventors: Carlos D. Folds, Winston-Salem; Daniel A. Gilbert, Pfafftown, both of N.C.

[73] Assignee: Larry J. Folds, Winston-Salem, N.C. ; a part interest

[22] Filed: Aug. 15, 1975

[21] Appl. No.: 606,407

[52] U.S. Cl. .............................. 126/271; 237/1 A
[51] Int. Cl.[2] ........................................ F24J 3/02
[58] Field of Search ........... 126/270, 271; 237/1 A; 203/DIG. 17; 202/234; 159/1 S

[56] References Cited
UNITED STATES PATENTS

| | | | |
|---|---|---|---|
| 737,551 | 8/1903 | Blanchard | 126/270 |
| 3,146,774 | 9/1964 | Yellott | 126/271 |
| 3,215,134 | 11/1965 | Thomason | 126/271 |
| 3,282,797 | 11/1966 | Hammer | 202/234 |
| 3,411,163 | 11/1968 | Myers, Jr. | 126/271 |

*Primary Examiner*—Kenneth W. Sprague
*Assistant Examiner*—James C. Yeung
*Attorney, Agent, or Firm*—Clarence A. O'Brien; Harvey B. Jacobson

[57] ABSTRACT

An inclined heat absorptive and conductive panel including downwardly opening inverted V-shaped grooves formed therein extending downwardly from the upper end portion of the panel toward the lower end portion of the panel is provided. In addition, structure is provided for introducing a heat absorptive liquid into the upper end portions of the grooves and second structure is provided for receiving and collecting liquid from the lower ends of the grooves. The cross sectional shape and size of the grooves is such to allow at least substantially all of the liquid introduced into the upper ends thereof to be retained therein by the cohesive and surface tension properties of the liquid during its movement downwardly through the grooves by gravity toward the lower end of the panel. The panel comprises an inclined partition secured across the interior of an upwardly opening housing and a substantially fluid tight cover is secured across the top of the housing above the panel. Further, the structure by which liquid flowing downwardly to the lower end of the panel is collected includes additional structure whereby a partial vacuum is maintained within the housing between the transparent cover and the heat absorptive panel.

9 Claims, 6 Drawing Figures

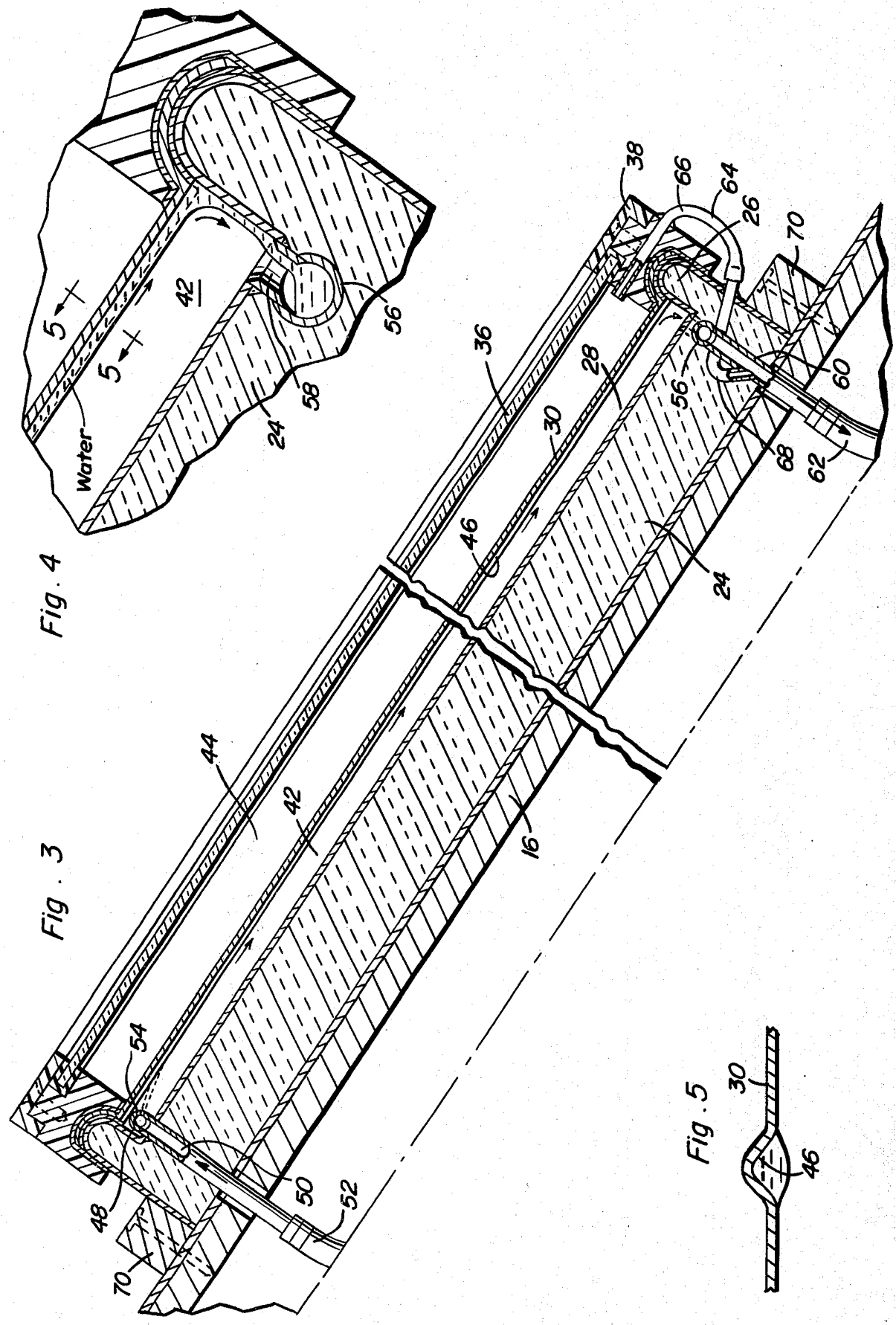

INVERTED OPEN CHANNEL SOLAR HEAT COLLECTOR PANEL

BACKGROUND OF THE INVENTION

Most panel-like solar heat collectors presently on the market make use of a closed piping system soldered onto a metal sheet or sandwiched metal sheets with passageways fabricated therebetween. The first type of present solar heat collector panels involving a closed piping system is very expensive to manufacture due to the high cost of the pipes and the expense attributable to labor required in mounting the pipes on their supportive plate. The second sandwiched type of collector also involves expensive materials and high labor costs as well as sophisticated production machinery.

Examples of various forms of solar heat collector panels presently known are disclosed in U.S. Pat. Nos. 2,358,476, 2,553,302, 3,321,012, 3,387,602 and 3,399,664.

BRIEF DESCRIPTION OF THE INVENTION

The solar heat collector of the instant invention comprises, essentially, an inclined heat absorptive and conductive panel having grooves formed in the undersurface thereof extending from the upper marginal portion of the panel to the lower marginal portion of the panel and of a cross sectional shape and size to allow at least substantially all of the liquid introduced into the upper ends of the grooves to flow downwardly therealong by gravity to the lower ends of the grooves without falling from the grooves.

By this type of construction great reductions in material costs, costs of labor and the cost of the machinery necessary to fabricate the panel are realized.

The main object of this invention is to provide an efficient solar heat collector panel.

Another object of this invention is to provide a solar heat collector panel which may be readily massed produced at a low cost.

Still another object of this invention is to provide a solar heat collector panel assembly including means by which condensation on the inner surface of the transparent cover therefor may be at least substantially eliminated.

A final object of this invention to be specifically enumerated herein is to provide a heat collector panel which will conform to conventional forms of manufacture, be of simple construction and easy to install so as to provide a device that will be economically feasible, long lasting and relatively trouble free in installation.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 3 is a fragmentary enlarged vertical sectional view taken substantially upon the plane indicated by the section line 3—3 of FIG. 1;

FIG. 4 is an enlarged sectional view illustrating the details of construction of the lower right hand portion of FIG. 3;

FIG. 5 is a fragmentary vertical sectional view taken substantially upon the plane indicated by the section line 5—5 of FIG. 4.

DETAILED DESCRIPTION OF THE INVENTION

Figure 1:
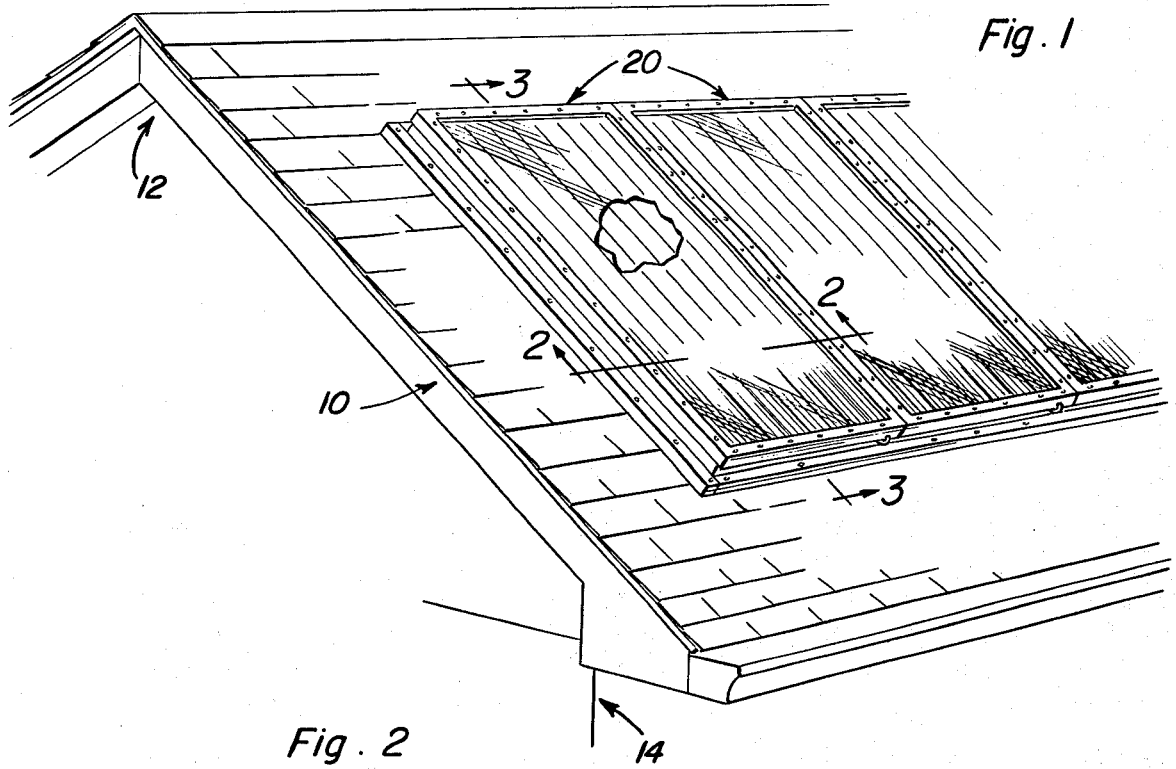
FIG. 1 is a fragmentary perspective view of the roof portion of a building structure having a plurality of the solar heat collector panel assemblies of the instant invention mounted thereon.

Referring now more specifically to the drawings numeral 10 generally designates one section of a roof structure 12 of a building 14. The roof section 12 includes wood panels 16 covered by means of conventional shingles 18 and a plurality of solar heat collector panel assemblies constructed in accordance with the present invention and referred to in general by the reference numeral 20 are disposed in overlying relation to the roof section 10. Each of the assemblies 20 includes a shallow upwardly opening and inclined housing referred to in general by the reference numeral 22 including a thick insulative bottom 24 and upstanding insulative peripheral side walls 26. At least the interior of the housing 22 may include a waterproof coating or layer 28 and an inclined heat absorptive panel 30 is secured across the interior of the housing 22 a spaced distance above the bottom 24, the panel 30 including peripheral edge portions 32 overlying and sealed relative to the upper marginal edges of the side walls 26. Further, a peripheral spacing frame 34 is sealingly secured over the peripheral edge portions 32 of the panel 30 and supports a transparent sheet 36 therefrom for closing the upper portion of the housing 22, a peripheral retaining frame 38 being secured over the frame 34 with spaced opposing surfaces of the frames 34 and 38 clampingly engaging the peripheral edges of the sheet 36, which edges may include peripheral seal means 40.

The interior of each assembly 20 is thereby divided into a lower compartment 42 and an upper compartment 44 disposed below and above, respectively, the panel 30. The compartments 42 and 44 are sealed relative to each other and the exterior of the housing 22.

The panel 30 defines a plurality of downwardly opening grooves 46 extending from the upper end thereof to the lower end thereof. The grooves 46 are defined by V-shaped ridges formed in the panel 30, although the grooves 46 could be cut into the lower surface portions of a thicker panel. In addition, the grooves 46 may be of different cross sectional shape than the inverted V-shaped cross sectional shape of the grooves 46 illustrated in FIG. 5. Still further, the grooves 46 generally parallel each other and are longitudinally straight extending in directions paralleling the longitudinal center line of the panel 30. However, the grooves need not necessarily be either parallel or longitudinally straight, although straight longitudinally grooves are the least expensive to manufacture.

A header pipe 48 is disposed transversely in the upper portion of the lower chamber or compartment 42 and receives liquid under pressure through a delivery pipe 50 extending upwardly through the bottom 24 (see FIG. 3) from a liquid supply line 52. The header pipe 48 includes a plurality of longitudinally spaced generally horizontally outwardly opening outlets 54 aligned with the upper ends of corresponding grooves 46 and the outlets 54 thereby function to discharge liquid under pressure into the upper ends of the grooves 46.

A collection pipe 56 is embedded in the lower portion of the bottom wall 24 and drain outlets 58 communicate the interior of the lower portion of the chamber 42 with the interior of the collection pipe. A drain pipe 60 extends downwardly from a central portion of the collection pipe 56 through the roof and to the inlet end of a return line 62. Still further, a vacuum line 64 includes an inlet end portion 66 opening into the lower portion of the interior of the compartment 44 and an outlet end portion 68 which opens in a downward direction into the drain pipe 60 and is thereby subject to reduced pressure by venturi action of liquids flowing downwardly through the drain pipe 60. Accordingly, the vacuum line 64 and the venturi action of the liquid flowing downwardly through the drain pipe 60 on the outlet end 68 of the vacuum line 64 function to maintain a partial vacuum within the compartment or chamber 44.

Figure 2:
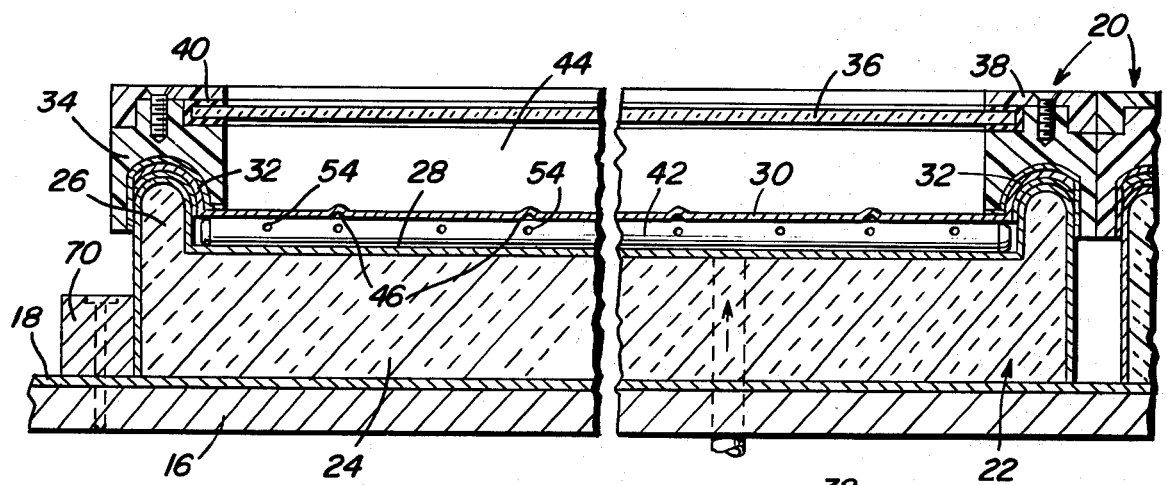
FIG. 2 is a fragmentary enlarged vertical sectional view taken substantially upon the plane indicated by the section line 2—2 of FIG. 1.
Figure 6:
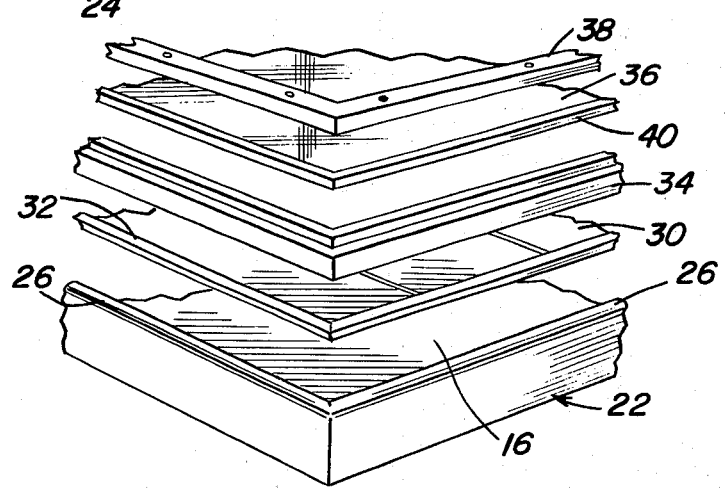
FIG. 6 is a fragmentary exploded perspective view of the various components of the heat collector panel assembly.

It may further be seen from FIGS. 2 and 3 of the drawings that a seal molding 70 extends around the grouped solar heat collector panel assemblies 20 on the roof section 10 and is secured to the latter.

As hereinbefore set forth, the sheet 36 is of transparent material and therefore allows a large percentage of the available radiant energy from sunlight incident on the assemblies 20 to pass downwardly through the sheet 36 onto the upper surface of the panel 30, which upper surface may be provided with a dark color heat absorptive coating, if desired. A heat absorptive liquid is pumped from a reservoir (not shown) therefor upwardly through the liquid supply line 52 and into the header pipe 48 for spray discharging into the upper ends of the grooves 46 after which the liquid flows downwardly through the grooves 46 and is retained therein by the cohesive and surface tension properties of the fluid until the fluid reaches the lower ends of the grooves 46 whereupon it strikes the inner surface of the lower side wall 26 of the housing 22 and flows downwardly along the inner surface of the lower side wall and into the collection pipe 56 for subsequent discharge downwardly through the drain pipe 60 creating a partial vacuum in the vacuum line 64 to partially evacuate the chamber 44 immediately beneath the sheet 36.

The inverted V-shaped cross sectional configuration of the grooves 46 is preferable in that the liquid flowing downwardly through the grooves 46 enjoys contact with the undersurface portions of the panel 30 over a reasonably large area thereof. Of course, the liquid flowing downwardly through the grooves 46 is warmed by the panel 30 which is heated by the radiant energy of the sunlight incident thereon. Further, the liquid flowing downwardly through the line 62 is returned to the aforementioned reservoir and suitable heat exchange mechanisms may be utilized to withdraw heat from the liquid within the reservoir for any desired purpose.

Inasmuch as the chambers 42 and 44 are sealed relative to each other and to the exterior of the housing 22, there is little possibility of condensation forming on the inner surface of the transparent sheet 36. Also, because the chamber 44 is at least partially evacuated, any condensation having a tendency to form on the inner surface of the sheet 36 is rapidly vaporized and there is little possibility of condensation being formed on the inner surface of the sheet 36 resulting in dispersion of radiant energy of the sun before it strikes the plate 30.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. A solar heat collector comprising an open top heat insulative housing, an inclined heat absorptive and conductive panel secured across said housing above the bottom thereof and at least substantially sealing that portion of the interior of said housing below said panel, said panel including downwardly opening underside grooves formed therein extending downwardly from the upper end portion thereof toward the lower end portion thereof, first means for introducing a heat absorptive liquid into the upper end portions of said grooves and second means for receiving and collecting liquid from the lower ends of said grooves, said grooves being of a cross sectional shape and size to allow at least substantially all of the liquid introduced into the upper ends of said grooves to be retained therein by the cohesive and surface tension properties of the liquid during its movement downwardly through said grooves by gravity to the lower end portion of said panel.

2. The combination of claim 1 wherein said grooves are generally straight.

3. The combination of claim 1 wherein said grooves are inverted V-shaped in cross section.

4. The combination of claim 3 wherein said grooves are generally straight.

5. The combination of claim 1 wherein said second means also includes means for collecting and receiving all liquid which may fall from said grooves downwardly on the bottom of said housing and flow downwardly along the bottom by gravity to the lower end portion of said housing.

6. The combination of claim 1 including a transparent sheet substantially sealingly closing the upper portion of said housing above said panel, said second means including means operative to maintain a partial vacuum in that portion of the interior of said housing disposed between said transparent sheet and said panel.

7. The combination of claim 6 wherein said grooves are generally straight.

8. The combination of claim 6 wherein said grooves are inverted V-shaped in cross section.

9. An inclined heat absorptive and conductive panel including downwardly opening underside grooves formed therein extending downwardly from the upper end portion thereof toward the lower end portion thereof, first means for introducing a heat absorptive liquid into the upper end portions of said grooves and second means for receiving and collecting liquid from the lower ends of said grooves, said grooves being of a cross sectional shape and size to allow at least substantially all of the liquid introduced into the upper ends thereof to be retained therein by the cohesive and surface tension properties of the liquid during its movement downwardly through said grooves by gravity toward the lower end of said panel.

* * * * *